United States Patent
Mazza et al.

(10) Patent No.: US 10,476,328 B2
(45) Date of Patent: Nov. 12, 2019

(54) ELECTRIC MOTOR WITH SEGMENTED ROTOR

(71) Applicant: ABB Schweiz AG, Baden (CH)

(72) Inventors: Lorenzo Mazza, Cary, NC (US); Alessandro Castagnini, Novara (IT); Giulio Secondo, Genoa (IT)

(73) Assignee: ABB Schweiz AG, Baden (CH)

(*) Notice: Subject to any disclaimer, the term of this patent is extended or adjusted under 35 U.S.C. 154(b) by 345 days.

(21) Appl. No.: 15/608,398

(22) Filed: May 30, 2017

(65) Prior Publication Data
US 2018/0351424 A1 Dec. 6, 2018

(51) Int. Cl.
*H02K 1/27* (2006.01)

(52) U.S. Cl.
CPC .................. *H02K 1/2766* (2013.01)

(58) Field of Classification Search
CPC ..... H02K 1/246; H02K 15/022; H02K 1/2766
See application file for complete search history.

(56) References Cited

U.S. PATENT DOCUMENTS

| | | | | |
|---|---|---|---|---|
| 6,836,045 B2* | 12/2004 | Murakami | ............. | H02K 1/246 310/156.53 |
| 6,849,983 B2* | 2/2005 | Tajima | .................. | H02K 1/246 310/156.53 |
| 7,560,846 B2* | 7/2009 | Lee | ........................ | H02K 1/246 310/162 |
| 7,851,960 B2 | 12/2010 | Lee et al. | | |
| 8,541,919 B2* | 9/2013 | Lokhandwalla | ..... | H02K 1/2766 310/156.46 |
| 2002/0175583 A1* | 11/2002 | Kikuchi | ................. | H02K 16/02 310/156.56 |
| 2010/0127584 A1* | 5/2010 | Gottfried | ............. | H02K 1/2766 310/61 |
| 2015/0280498 A1 | 10/2015 | Kolehmainen | | |

OTHER PUBLICATIONS

DuPont; Oct. 2006; HEV Motors—Electrical steel sheets covered with the self-bonding varnish; 1 pg.
Business Wire; Oct. 24, 2016; Axalta Launches New Self-bonding Electrical Steel Coating; 3 pgs.

* cited by examiner

*Primary Examiner* — Mohamad A Musleh
(74) *Attorney, Agent, or Firm* — Taft Stettinius & Hollister LLP; J. Bruce Schelkopf

(57) ABSTRACT

A rotor for an electric motor is provided. The rotor is constructed of a stack of first and second laminations. The laminations include segments and insulated regions between the segments. The first laminations include interconnections such that the first laminations are self-supporting. The second laminations are affixed to the first laminations to support the segments of the second laminations.

20 Claims, 5 Drawing Sheets

ELECTRIC MOTOR WITH SEGMENTED ROTOR

BACKGROUND

The present inventions relate generally to electric motors, and more particularly, to an electric motor with a rotor made of a series of laminations.

An example of a conventional rotor 10 for an electric motor is shown in FIG. 1. As shown, the rotor 10 may be made of a series of laminations 12 that are stacked together. In the particular rotor 10 shown in FIG. 1, the poles 14 of the rotor 10 are formed by magnetically permeable segments 16 that are isolated from each other by insulated regions 18 disposed between the segments 16. Thus, the rotor stack 20 of FIG. 1 may be considered a reluctance rotor 10 for a reluctance electric motor. In many embodiments, the insulated regions 18 are air spaces 18, or voids 18. Although not shown, a rotor shaft is disposed through the center hole 21 of the stack 20.

In order to maintain the physical integrity of the rotor stack 20 and prevent the laminations 12 from rotating relative to each other, a mechanical structure is required to keep the segments 16 of adjacent laminations 12 aligned with each other. One common solution to satisfy this need is illustrated in FIG. 1. As shown, each of the segments 16 of the individual laminations 12 are interconnected with each other with an interconnection 22, which is sometimes referred to as a bridge 22. The interconnection 22 is typically an integral thin portion of the lamination 12 that extends between and connects adjacent segments 16 together. Thus, as shown in FIG. 1, each of the laminations 12 are individually fully self-supporting. In general, most or all of the laminations 12 in the stack 20 have matching shapes.

In order to hold the stack 20 of laminations 12 together in a rigid structure, some type of additional hardware is typically needed to secure the laminations 12 together. One type of conventional securing hardware is shown in FIG. 1. As shown, one or more pins 24 located off-center from the rotor shaft may extend through a hole 26 in the laminations 12. Thus, the pins 24 maintain the laminations 12 in lateral alignment with each other and prevent the laminations 12 from rotating relative to each other. The pins 24 may also be used to squeeze the laminations 12 against each other. For example, end plates 28 may be provided at opposite ends of the stack 20, and the pins 24 may also extend through the end plates 28. The pins 24 may then be used to engage the end plates 28 (e.g., with threaded fasteners) to squeeze the end plates 28 and the laminations 12 together.

Although the above-described arrangement is widely used to form electric motor rotors, the design results in less than optimal performance in electric motors. As shown in FIG. 2, when the rotor 10 is used in an electric motor, magnetic flux is generated by the stator and directed at the rotor 10. During use of the electric motor, the magnetic flux is cycled and rotated around the stator in order to attract and/or repel the rotor poles 14 to force the rotor 10 and rotor shaft to rotate. An example of magnetic flux lines 30 directed at the rotor 10 is illustrated in FIG. 2. As shown, some 32 of the magnetic flux 30 travels through the interconnections 22 between adjacent segments 16. This portion of the magnetic flux 30 is known as flux leakage 32, since in an optimal design the magnetic flux 30 would only travel through defined rotor poles 14 and would not travel between adjacent rotor poles 14. However, in the conventional rotor 10 shown in FIGS. 1 and 2, it is difficult to prevent flux leakage 32 since the mechanical interconnections 22 between adjacent segments 16 are commonly made out of the same magnetically permeable material as the segments 16 themselves.

SUMMARY

A rotor for an electric motor is described. The rotor is made of a stack of laminations that are secured together. The laminations include segments of a magnetically permeable material and insulated regions between the segments. In a first type of lamination, interconnections are provided to connect adjacent segments together across the insulated regions. A second type of lamination is disposed in the stack between two of the first laminations. The second laminations are laterally affixed to the first laminations in order to physically support the segments of the second laminations.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
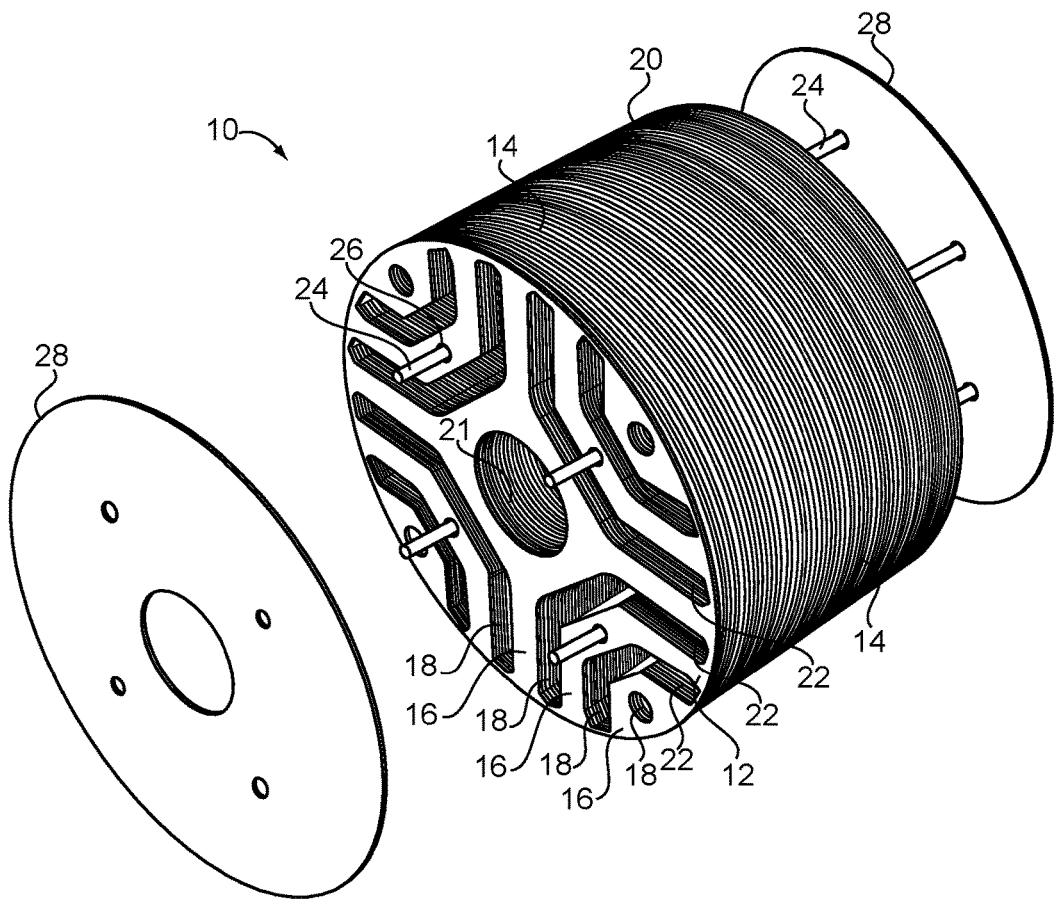
FIG. 1 is a perspective view of a conventional rotor.
Figure 2:
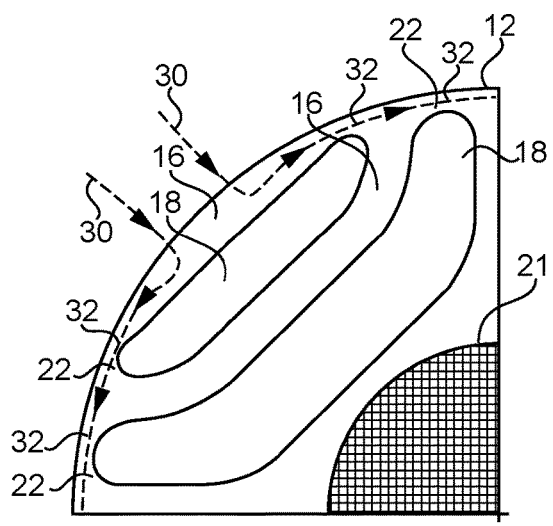
FIG. 2 is a plan view of a portion of a conventional lamination for a rotor stack.
Figure 3:
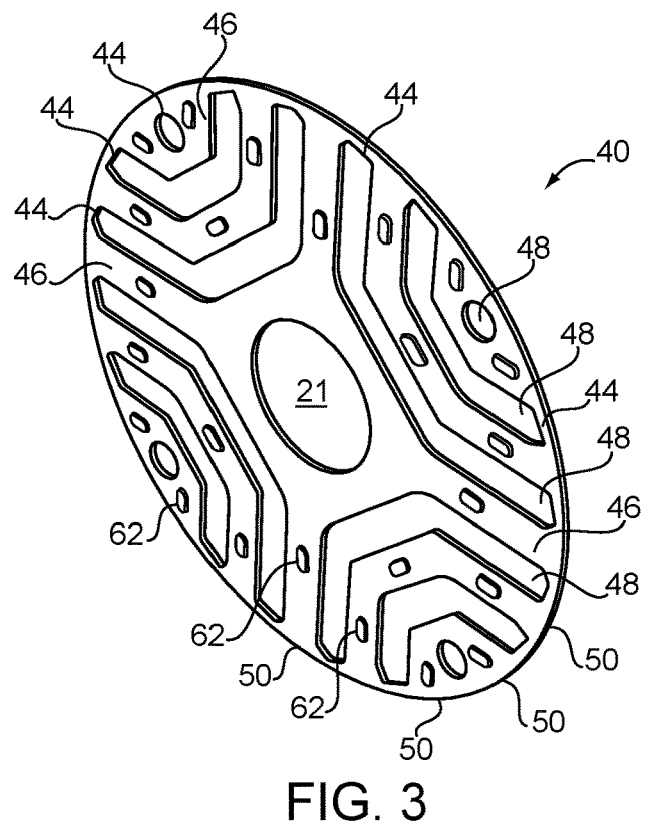
FIG. 3 is a perspective view of a first lamination.

Referring now to FIGS. 3-6, a rotor 52 may be made from a stack 40 of at least two different types of laminations 42, 54. The first type of lamination 42 used in the rotor stack 40 is shown in FIG. 3. The first lamination 42 may be thought of as a conventional lamination in the sense that the first lamination 42 includes interconnections 44 between adjacent segments 46 to form a standalone, self-supporting lamination 42. That is, the lamination 42 may be made of an integral layer of silicon steel. The lamination 42 may have a number of segments 46 that are connected together with interconnections 44. The interconnections 44 are preferably integral with the segments 46 and made of the same material as the segments 46 (e.g., a magnetically permeable material, such as silicon steel). As shown, the interconnections 44 may form an outer periphery of the lamination 42 and bridge between the segments 46.

The segments 46 are at least partially isolated from each other by insulated regions 48 arranged between the segments 46. Although it is possible for the insulated regions 48 to be various types of non-magnetically permeable materials, it is preferred for the insulated regions 48 to be air spaces 48, or voids 48, between the segments 46. Thus, the segments 46 form rotor pole regions 50 between the insulated regions 48 which, when aligned with the corresponding segments 46, 56 of adjacent laminations 42, 54, form the poles 66 of a rotor 52.

Figure 4:
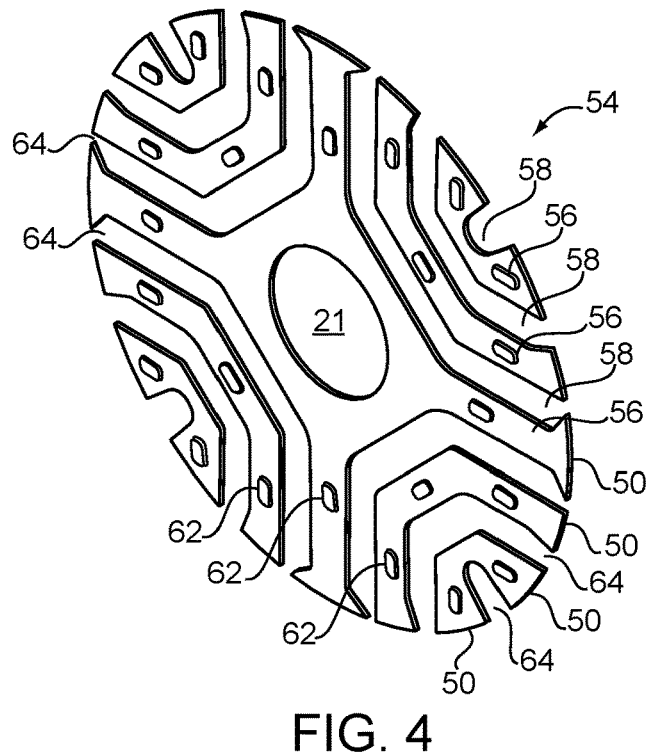
FIG. 4 is a perspective view of a second lamination.

As shown in FIG. 4, a second type of lamination 54 may also be provided that uses the physical support of the interconnections 44 of the first laminations 42. In particular, it is preferable in the second laminations 54 for interconnections made of a magnetically permeable material to be eliminated. As shown in FIG. 4, it is particularly preferred for all interconnections between adjacent segments 56 to be eliminated. Thus, the segments 56 in the second laminations 54 may be completely isolated from each other. In general, the segments 56 and insulated regions 58 of the second laminations 54 match the shape and orientation of the segments 46 and isolated regions 48 of the first laminations 42. However, because the physical interconnections between adjacent segments 56 have been eliminated from the second laminations 54, the structure of the second laminations 54 is not self-supporting. That is, while the individual lamination 54 in FIG. 4 is shown with each of the segments 56 positioned in the desired locations, the lamination 54 itself cannot retain the segments 56 in the desired arrangement.

Figure 5:
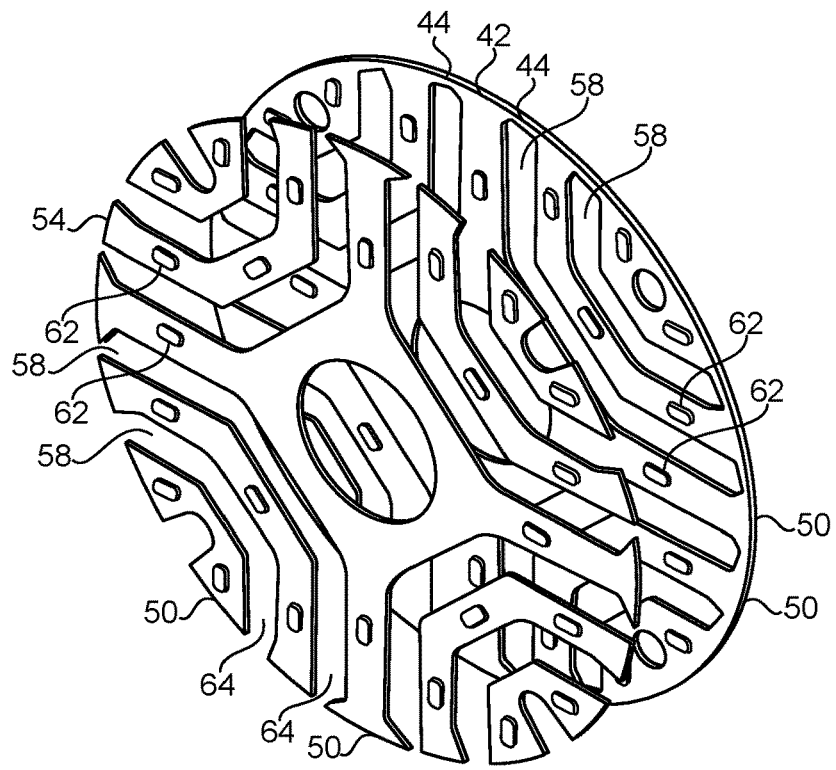
FIG. 5 is a perspective view of the first and second laminations aligned with each other.
Figure 6:
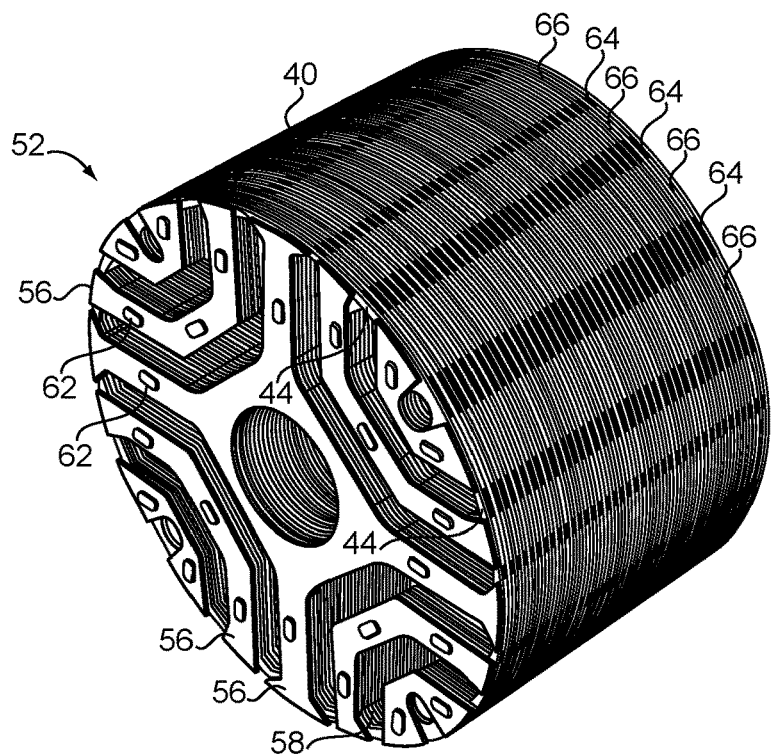
FIG. 6 is a perspective view of a rotor with the first and second laminations.

As shown in FIG. 5, the first and second laminations 42, 54 may be stacked against each other so that the segments 46, 56 and insulated regions 48, 58 of the laminations 42, 54 are aligned with each other. As shown in FIG. 6, a series of first and second laminations 42, 54 may be stacked against each other to form a rotor stack 60 for an electric motor rotor 52. In order to physically support the loose segments 56 of the second laminations 54 in the desired locations, each of the segments 56 of the second laminations 54 is secured to an axially adjacent segment 46, 56 of an axially adjacent lamination 42, 54. For example, as shown in FIG. 6, the segments 46, 56 may be partially punched 62 against axially adjacent segments 46, 56 to physically interlock the segments 46, 56 together. Axially adjacent segments 46, 56 may also be secured together with adhesive or other methods. While the punched regions 62 are shown in FIGS. 3-5 for illustration purposes, it is understood that the laminations 42, 54 will not be punched 62 until after each lamination 42, 54 is stacked against another lamination 42, 54. As a result, second laminations 54 are laterally affixed to the first laminations 42. Thus, the interconnections 44 of the first laminations 42 physically support the segments 56 of the second laminations 54.

Figure 7:
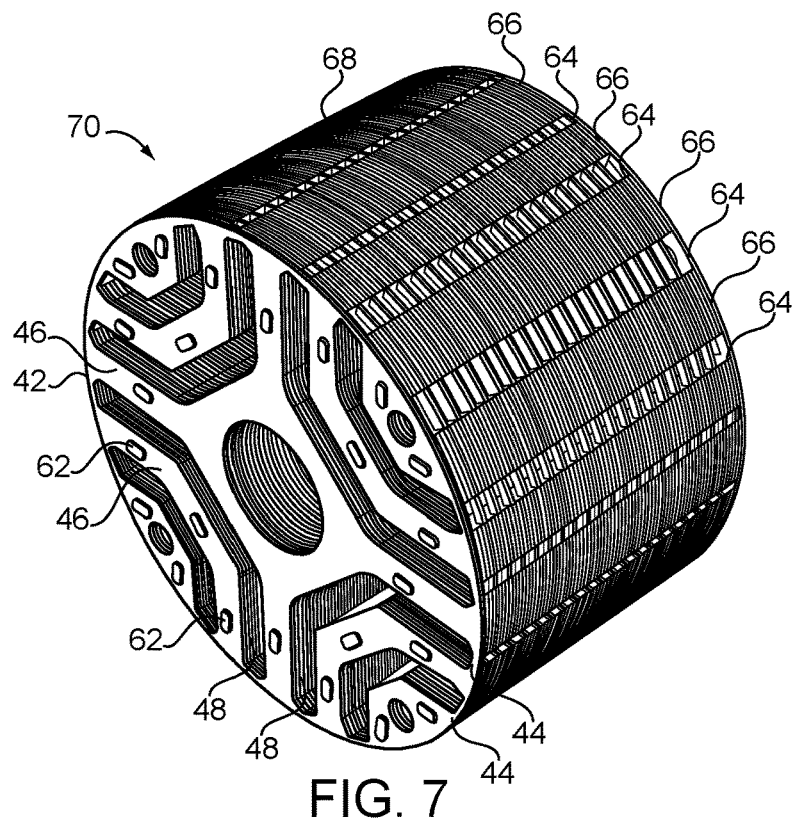
FIG. 7 is a perspective view of another rotor with the first and second laminations.

As shown in FIG. 6, it is preferable for at least one of the second laminations 54 to be located between two of the first laminations 42. It is also possible to have more than one second lamination 54 between two first laminations 42. For example, as shown in FIG. 7, there may be multiple second laminations 54 between two first laminations 42. In this case, the loose segments 56 of the second laminations 54 may be secured to corresponding loose segments 56 of adjacent second laminations 54. However, since all of the laminations 42, 54 are secured to each other, the segments 56 of the second laminations 54 remain laterally affixed to the first laminations 42.

As shown in FIGS. 6 and 7, because the second laminations 54 do not have interconnections between the segments 56 of the second laminations 54, voids 64 exists between each of the rotor poles 66 of the rotor stack 40, 68. While the rotor poles 66 are not completely separated from each other since the interconnections 44 of the first laminations 42 extend across the gaps between insulated regions 48, the voids 64 created by the second laminations 54 significantly reduce flux leakage between the rotor poles 66. That is, although flux leakage is still possible through the interconnections 44 of the first laminations 42, the second laminations 54 have voids 64 that prevent flux leakage. Thus, the area through which flux leakage may occur (i.e., the interconnections 44 of the first laminations 42) is reduced by half with a 1:1 ratio of first and second laminations 42, 54, and even more with a higher ratio of second laminations 54. Thus, although it is possible for the rotor stack 40 to have one second lamination 54 between two first laminations 42 (FIG. 6), it may be desirable for the stack 68 to have more than one second lamination 54 between two first laminations 42 (FIG. 7). For example, it may be desirable to have between two and ten second laminations 54 between two first laminations 42.

In addition to reducing flux leakage, it may also be possible to simplify the assembly of the rotor stack 40. For example, because each of the laminations 42, 54 are secured to an adjacent lamination 42, 54, it may be possible to eliminate conventional end plates 28 for holding the stack 40 together by squeezing the laminations 42, 54 together. Likewise, it may be possible to eliminate off-center pins 24 extending through the stack 40 for holding the stack 40 together by squeezing the laminations 42, 54 together. Thus, it may be possible to eliminate all off-center pins from the rotor stack 40 if desired.

Figure 8:
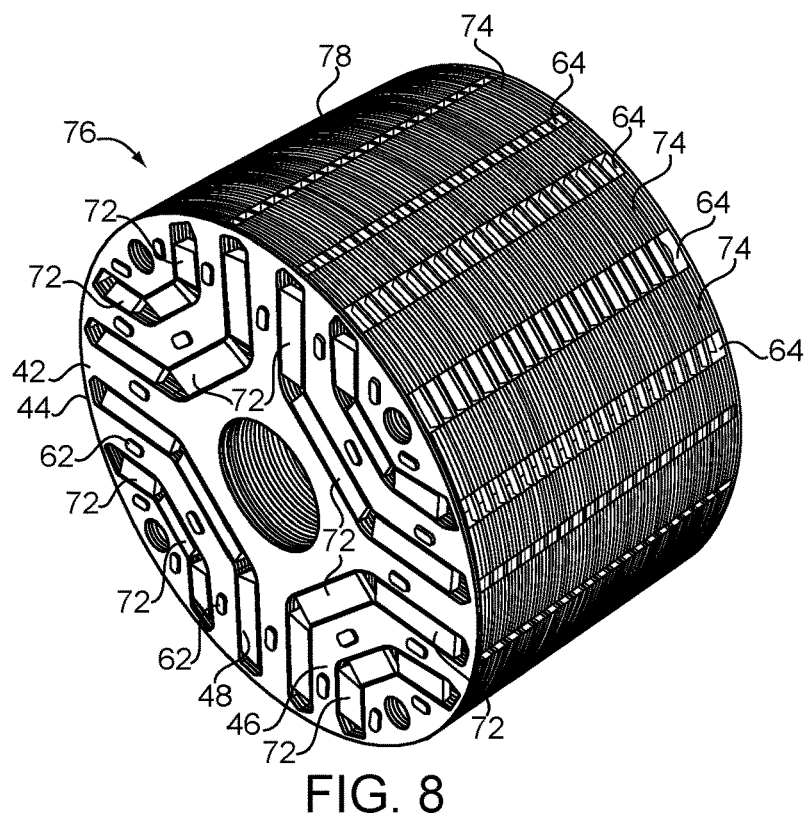
FIG. 8 is a perspective view of a permanent magnet rotor.

In FIGS. 6 and 7, the rotor stacks 40, 68 are shown with pole regions 50 that form reluctance rotor poles 66 in the rotor 52, 70. Thus, the rotor stacks 40, 68 in FIGS. 6 and 7 would be used in a reluctance electric motor. Alternatively, as shown in FIG. 8, permanent magnets 72 may be provided to form permanent magnetic rotor poles 74 in the rotor 76. Thus, the rotor stack 78 in FIG. 8 would be used in a permanent magnet electric motor.

Figure 9:
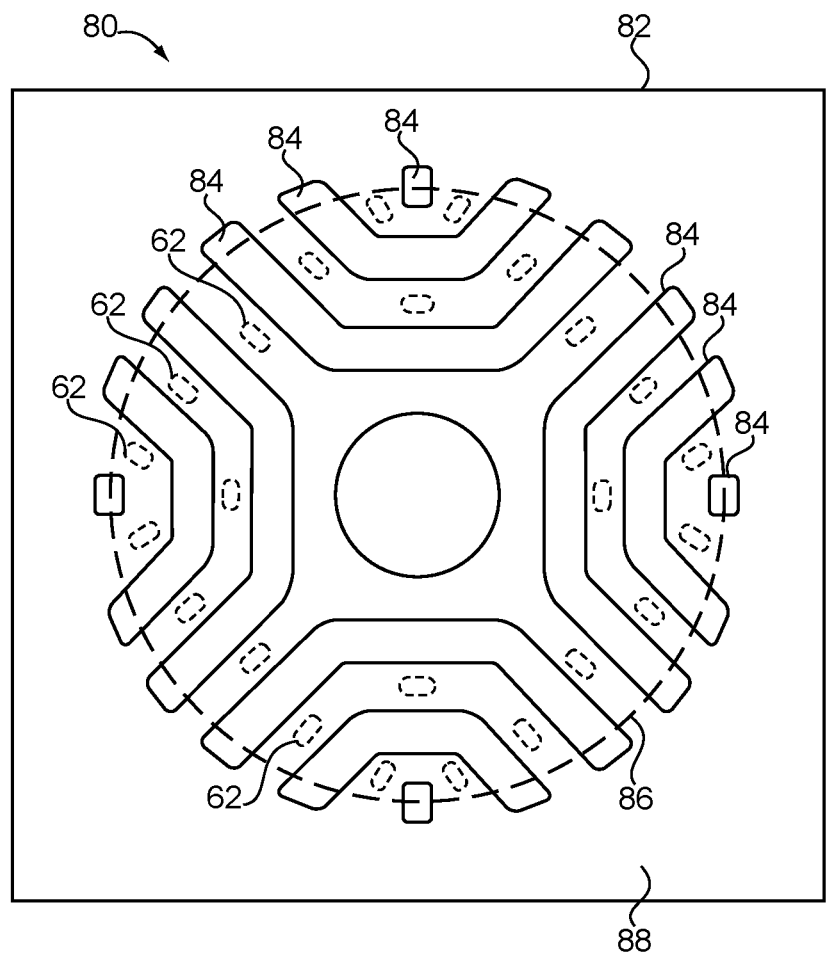
FIG. 9 is a plan view of a stamping for the second lamination.

Although the laminations 42, 54 may be stacked and assembled in any manner desired, one method of stacking and securing the laminations 42, 54 is illustrated in FIG. 9. In particular, an exemplary stamping 80 for a second lamination 54 is shown in FIG. 9. Since the first laminations 42 are mostly conventional in structure, the first laminations 42 may be formed in a conventional manner (e.g., stampings) and stacked using conventional techniques. In the case of the second laminations 54, it will be desirable to control the placement of the loose segments 56 before they are secured to the axially adjacent segments 46, 56. One possible technique is to stamp a plate 82 with voids 84 to form the insulated regions 48. However, unlike the voids 48 of the first laminations 42, the voids 84 of the second laminations 54 may extend radially outward beyond the outer periphery 86 of the rotor stack 40. The stamped plate 82 may then be placed on the rotor stack 40 with the segments 56 and insulated regions 48 aligned with the corresponding segments 46, 56 and insulated regions 48, 58 of the stack 40. Next, the segments 56 of the plate 82 may be punched 62 to secure the segments to the stack 40. After the segments 56 have been secured to corresponding segments 46, 56 in the stack 40 (e.g., by punching 62 or with adhesive), the plate 82 may be punched 86 around the periphery 86 of the rotor stack 40. The outer region 88 of the plate 82 may then be removed from the stack 40 and the stacking process may continue.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. An electric motor with a rotor, the rotor comprising:
a plurality of first laminations, each of the first laminations comprising a plurality of first segments, a plurality of first insulated regions, and a plurality of interconnections, the first segments forming a number of magnetically permeable pole regions, the first insulated regions being disposed between the first segments and isolating adjacent first segments from each other, and the interconnections mechanically connecting adjacent first segments together to physically support the first segments;
a plurality of second laminations, each of the second laminations comprising a plurality of second segments and a plurality of second insulated regions, the second segments forming a number of magnetically permeable pole regions, and the second insulated regions being disposed between the second segments and isolating adjacent second segments from each other;
wherein the first and second laminations are stacked against each other, at least one of the second laminations being disposed between two of the first laminations, the second laminations being laterally affixed to the first laminations such that the interconnections of the first laminations physically support the second segments of the second laminations, and the second segments reduce flux leakage between rotor poles of the rotor.

2. The electric motor according to claim 1, wherein the second laminations are characterized by the absence of magnetically permeable interconnections between adjacent second segments.

3. The electric motor according to claim 2, wherein adjacent second segments are completely isolated from each other, the second laminations being characterized by the absence of any interconnections between adjacent second segments.

4. The electric motor according to claim 1, wherein the rotor is further characterized by the absence of end plates squeezing the first and second laminations together.

5. The electric motor according to claim 1, wherein the rotor is further characterized by the absence of one or more off-center pins extending through the first and second laminations and squeezing the first and second laminations together.

6. The electric motor according to claim 5, wherein the rotor is further characterized by the absence of any off-center pins extending through the first and second laminations.

7. The electric motor according to claim 1, wherein the pole regions of the first and second laminations together form reluctance rotor poles, the electric motor being a reluctance electric motor.

8. The electric motor according to claim 1, wherein permanent magnets form permanent magnetic rotor poles, the electric motor being a permanent magnet electric motor.

9. The electric motor according to claim 1, wherein the first and second laminations are punched against each other to physically interlock and laterally affix the first and second laminations together.

10. The electric motor according to claim 1, wherein the first and second laminations are laterally affixed together with adhesive.

11. The electric motor according to claim 1, wherein one of the second laminations is disposed between two of the first laminations.

12. The electric motor according to claim 1, wherein between two and ten of the second laminations are disposed between two of the first laminations.

13. The electric motor according to claim 1, wherein the second laminations are characterized by the absence of magnetically permeable interconnections between adjacent second segments, and the rotor is further characterized by the absence of end plates squeezing the first and second laminations together.

14. The electric motor according to claim 13, wherein adjacent second segments are completely isolated from each other, the second laminations being characterized by the absence of any interconnections between adjacent second segments, and the rotor is further characterized by the absence of one or more off-center pins extending through the first and second laminations and squeezing the first and second laminations together.

15. The electric motor according to claim 14, wherein the first and second laminations are punched against each other to physically interlock and laterally affix the first and second laminations together.

16. The electric motor according to claim 15, wherein the pole regions of the first and second laminations together form reluctance rotor poles, the electric motor being a reluctance electric motor.

17. The electric motor according to claim 16, wherein between two and ten of the second laminations are disposed between two of the first laminations.

18. The electric motor according to claim 17, wherein the rotor is further characterized by the absence of any off-center pins extending through the first and second laminations.

19. The electric motor according to claim 1, wherein the second laminations are characterized by the absence of magnetically permeable interconnections between adjacent second segments, adjacent second segments are completely isolated from each other, the second laminations being characterized by the absence of any interconnections between adjacent second segments, and between two and ten of the second laminations are disposed between two of the first laminations.

20. The electric motor according to claim 19, wherein the pole regions of the first and second laminations together form reluctance rotor poles, the electric motor being a reluctance electric motor.

* * * * *